United States Patent [19]

Dolden et al.

[11] Patent Number: 4,925,914
[45] Date of Patent: May 15, 1990

[54] CATALYTIC SUSPENSION/DISPERSION PREPARATION OF POLYAMIDES FROM POLYAMIDE FORMING SALT

[75] Inventors: John G. Dolden, Guildford, England; Gaynor P. Harris; Matthew B. Studholme, both of Barry, Wales

[73] Assignee: BP Chemicals Limited, London, England

[21] Appl. No.: 235,671

[22] Filed: Aug. 24, 1988

[30] Foreign Application Priority Data

Aug. 29, 1987 [GB] United Kingdom ............... 8720490

[51] Int. Cl.$^5$ ............................................. C08G 69/30
[52] U.S. Cl. .................................. 528/336; 528/126; 528/207; 528/313
[58] Field of Search ............... 528/336, 126, 207, 313

[56] References Cited

U.S. PATENT DOCUMENTS 3,173,898  3/1965  Sum ..................................... 528/336
3,870,685  3/1975  Jones et al. ......................... 528/336

FOREIGN PATENT DOCUMENTS 852672  10/1960  United Kingdom .

Primary Examiner—Harold D. Anderson
Attorney, Agent, or Firm—Brooks, Haidt, Haffner & Delahunty

[57] ABSTRACT

This invention relates to a process for producing high molecular weight homopolyamides from a nylon salt formed from substantially equimolar proportions of a diamine and a dicarboxylic acid. The process comprises: (a) dispersing the nylon salt in its finely divided state having uniformly preblended therein a solid hypophosphite catalyst in a liquid aliphatic hydrocarbon, and polycondensing the dispersion either (b) at a temperature above 100° C. but below the lower of the two temperatures representing the melting point of the nylon salt and the eventual polyamide product respectively where the polyamide product is a crystalline, or, (c) at a temperature up to 60° C. above the glass transition temperature of the polyamide product where such product is amorphous.

14 Claims, No Drawings

CATALYTIC SUSPENSION/DISPERSION PREPARATION OF POLYAMIDES FROM POLYAMIDE FORMING SALT

The present invention relates to a process for preparing homopolyamides of relatively high molecular weight.

It is well known that polyamides can be produced by melt condensation of a salt formed from a diamine and a dicarboxylic acid. The products of direct melt condensation are however of relatively low molecular weight. In GB-A-1410005, GB-A-1410006 and GB-A-1410007, the need to have a solid precondensation step in order to produce polyamides of a relatively high molecular weight is recognised. In these prior patents, a solid salt formed from the diamine and the diacid is initially heated under reflux at 200°–220° C. in the presence of water and the resultant precondensed product is subsequently melt condensed at 270° C.

There are some practical difficulties in operating this procedure especially upon scale up due to the tendency of the salts to agglomerate in the presence of water or moisture. The agglomerisation reduces stirring efficiency thereby resulting in poor heat transfer and hence gives rise to inadequate polymerisation.

One of the methods proposed to overcome such a problem is to carry out the solid state polycondensation in a inert solvent. Such processes are described by Chatani-Yuzo in Progress in Polymer Science (Japan), Volume 7, pp 168 et seq (1975) and by Kampouris, EM in Polymer, Volume 17 (May), pp 409–412 (1976).

Kampouris states in this Article that in some cases nylon salts can be converted to polyamides through intermediates of lower melting points involving a solid-melt-solid sequence which is incompatible with known solid state polyamidation process. More specifically he describes a process in which a suspension of raw materials (salts and amino acids) in a suitable non-solvent is heated with agitation at the boiling point preferably in the presence of a catalyst, for several hours, then cooled, washed, filtered and dried to recover the polymer. This paper describes polymerisation of hexamethylene diammonium maleate.

In another article by Kampouris et al in Polymer, Volume 27 (Sept) 1986, pp 1437 et seq, the authors describe the influence of catalysts on a single stage polyamidation. In this process the catalyst is incorporated into the nylon salt by a 'nucleation' procedure before the solid-state reaction is begun. More specifically, in this paper up to 100% conversion of dodecamethylene adipate is said to be achieved e.g. by heating this salt at 126° C. (20° C. below the melting point of 151–2° C.) initially for 24 hours followed by a further 12 hours heating, the temperature increasing at the rate of 1° C. per minutes to a maximum of 138° C. using dibasic sodium arsenate heptahydrate as catalyst, a product of very low molecular weight (limiting viscosity number=28 ml/g in m-cresol at 100° F.) is produced by the solid state polymerisation technique.

In a further paper by Kampouris et (Polymer, 1986, 27, 1433 et seq) it is reported that by using boric acid instead of sodium arsenate heptahydrate a low molecular weight product having a limited viscosity of 35 ml/g (m-cresol 100° F.) is produced.

It has now been found that polyamides of relatively higher molecular weight can be achieved over a relatively shorter duration if a specific combination of catalyst and reaction conditions are employed.

Accordingly, the present invention is a process for producing homopolyamides from a nylon salt formed from substantially equimolar proportions of a diamine and a dicarboxylic acid said process comprising:

(a) dispersing and/or suspending in a liquid aliphatic hydrocarbon medium the nylon salt in its finely divided state having uniformly preblended therein a solid hypophosphite catalyst, and either, (b) polycondensing the nylon salt containing the preblended catalyst so dispersed and/or suspended at a temperature above 100° C. but below the lower of the two temperature representing the melting point of the nylon salt and the eventual polyamide product respectively where the polyamide product is crystalline, or, (c) polycondensing the nylon salt containing the preblended catalyst so dispersed and/or suspended at a temperature up to 60° C. above the glass transition temperature of the polyamide product where such product is amorphous.

The acid component of the nylon salt is suitably derived from aliphatic, alicyclic or aromatic dicarboxylic acids. Specific examples of such acids include adipic acid, suberic acid, sebacic acid, dodecanedioic acid, 1,2- or 1,3-cyclohexane dicarboxylic acid, 1,2- or 1,3-phenylene diacetic acid, 1,2- or 1,3-cyclohexane diacetic acid, isophthalic acid, terephthalic acid, 4,4'-oxybis (benzoic acid), 4,4'-benzophenone dicarboxylic acid, 2,6-naphthalene dicarboxylic acid, phenyl indane and p-t-butyl isophthalic acid.

The amine component of the nylon salt is suitably derived from an aliphatic, alicyclic or an aromatic diamine. Specific examples of such diamines include hexamethylene diamine, 2-methyl pentamethylene diamine, 2-methyl hexamethylene diamine, 3-methyl hexamethylene diamine, 2,5-dimethyl hexamethylene diamine, 2,2-dimethyl pentamethylene diamine, 5-methylnonane diamine, dodecamethylene diamine, 2,2,4- and 2,4,4-trimethyl hexamethylene diamines, 2,2,7,7-tetramethyl octamethylene diamine, isophorone diamine, meta-xylylene diamine, paraxylylene diamine, diaminodicyclohexyl methane and $C_2-C_{16}$ aliphatic diamines which maybe substituted with one or more alkyl groups.

The nylon salts as specified herein are also meant to include amino-acids and lactams such as 12-aminododecanoic acid and caprolactam.

The hypophosphite catalyst used in the present invention may be an alkali metal, alkaline earth metal or ammonium hypophosphite and is preferably ammonium hypophosphite. The catalyst is used in solid particulate form during pre-blending. The amount of catalyst preblended with the nylon salt is suitably from 0.01–5% w/v, preferably from 0.05–3% w/v of the nylon salt in the blend.

The nylon salt and the catalyst may be pre-blended by grinding the two together into fine particles either before dispersion into the liquid aliphatic hydrocarbon or during the dispersion of the two in the liquid hydrocarbon. In the latter case this can be achieved by using a high speed disperser or disintegrator.

The liquid aliphatic hydrocarbon suitably has at least five carbon atoms and is perferably dodecane or liquid paraffin. It would be advantageous if the catalyst is soluble in the liquid hydrocarbon medium and reaction rates may increase as a result. It is essential however that the liquid hydrocarbon chosen is such that the nylon salt is insoluble in the hydrocarbon.

The amount of liquid hydrocarbon used is suitably such that the combined weight of nylon salt and catalyst to the volume of liquid has a ratio from 10 to 60 w/v, preferably from 25 to 60 w/v in order to form a good slurry.

The dispersion so formed is then polycondensed in a single step by refluxing the dispersion to a temperature above 100° C. but below the lower of the two temperatures representing the melting points of the nylon salt and the product polyamide respectively.

The polycondensation is carried out in the substantial absence of any oxidising gases, e.g., oxygen, and it is preferable to reflux the dispersion in an atmosphere which is inert under the reaction conditions, e.g., nitrogen. Moreover, the reactants used are substantially dry and no water from an external source is added to the polycondensation reaction. It is likely that some detectable levels of moisture may be present in the salt due to the water of crystallisation in the solid nylon salt used as reactant.

Clearly, the precise polycondensation temperature will be dependent upon the composition of the nylon salt. However, as a general guide in the case of a crystalline polyamide product this temperature is suitably about 15° to 20° C. below the melting point of the salt or at least 25° C., preferably 30° C. below the melting point of the polyamide product, whichever is the lower of the two. If, on the other hand, the polyamide product is amorphous then the polycondensation temperature maybe as high as 60° C. above the glass transistion temperature of the product. Thus the temperature may vary, e.g., from 100° C.-300° C.

The polycondensation temperature need normally be maintained at that level for only 5 to 10 hours in order to achieve a product having an inherent viscosity of 0.8 to 1.3 dl/g at 25° C. in a concentration of 0.1% w/v in concentrated sulphuric acid (BDH Ltd, GPR Grade). Specifically in the context of a melt condensation process, it has been found that if the hypophosphite catalyst is replaced by disodium arsenate dianhydride of prior art as catalyst, a relatively higher amount of catalyst is needed and the resultant product polyamide when melted discoloured rapidly and turned black. This result shows that such an arsenate catalyst is unsuitable for use in the solid state polymerisation of nylon salt formulations which are then subsequently melted for further polymerisation to increase molecular weight and/or melt processing.

The polymer is obtained by the process of the present invention in a convenient powder form—which can be particularly useful in powder coating or hot melt adhesive applications.

The present invention is further illustrated with reference to the following examples.

In the examples below the following abbreviations have been used for convenience:
TPA—Terephthalic acid
HMD—Hexamethylene diamine
MXD—Metaxylylene diamine
TMHMD—Equimolar mixture of 2,2,4- and 2,4,4-trimethyl hexamethylene diamine
—DMD—Dodecamethylene diamine
AHP—Ammonium hypophosphite
IV—Inherent viscosity In the following Examples flow times were measured in BS/U, ASTM D445 type D U-tube viscometers suspended in a viscometer bath controlled at 25 +/− 0.01° C. No corrections were made for kinetic energy or end effects. The inherent viscosity is calculated from IV=-log (t/to)/C where C=concentration in $gdl^{-1}$, t=solution flow time in seconds and $t_0$=solvent flow time in seconds after temperature equilibrium of solvent in viscometer overnight.

EXAMPLE 1

TPA/HMD nylon salt (0.35 moles; 100 g) and ammonium hypophosphite (2.0% wt; 2.007 g) were finely ground together in a pestle and mortar and charged together with dodecane (250 ml) to a 700 cm³ cylindrical wide-necked reaction vessel fitted with an anchor stirrer and a fractionating column attached. The reactor was heated in a fluidised sandbath at 217° C. for 10 hours with the reaction charge under a nitrogen atmosphere. The product was filtered off, washed with hexane and dried at 65° C. under vacuum for 16 hours. It was found to be completely water-insoluble and had an IV of 0.73 $dlg^{-1}$ at 25° C. in a concentration of 0.15% w/v in concentrated sulphuric acid (BDH Ltd, GPR grade).

In a second experiment, 20 gm of TPA/HMD salt containing 2% TPA ammonium hypophosphite were carefully ground in a pestle and mortar, and heated for 6 hours with refluxing in liquid paraffin at 217° C. The product was filtered off, washed and dried overnight. The product was completely insoluble in water and had an IV of 0.73 $dlg^{-1}$, measured at 0.15% in concentrated $H_2SO_4$ (BHD Ltd, GPR grade) at 25° C.

EXAMPLE 2

TPA/MXD nylon salt (0.33 moles; 100 g) and ammonium hypophosphite (2.0% wt; 2.0 g) were finely ground together in a pestle and mortar and heated in a reaction vessel with dodecane (400 cm³) with mechanical agitation at 209° C. for 5 hours to give a % yield of 76% of a water-insoluble product with an IV of 0.78 $dlg^{-1}$.

In a comparative experiment (not according to the invention) 20 gm salt and 30 gm triphenyl phosphite were heated for 5 hours at 217° C. in liquid paraffin, but produced a polymer with an IV of 0.11 $dlg^{-1}$. The experiment was repeated, except that a Silverson mixer was first employed to fully disperse the salt and catalyst. The products had an IV of 0.15 $dlg^{-1}$. When the triphenyl phosphite was omitted a product yield of 100% of polymer with an IV of 0.49 $dlg^{-1}$ measured as in Example 1 was obtained. These comparative experiments show that the conventional catalyst such as triphenyl phosphite used in melt polycondensations are not necessarily suitable for solid state polymerisations.

EXAMPLE 3

TPA/TMHMD nylon salt (0.31 moles; 100 g) and AHP (0.5% wt; 0.5 g) were ground together finely and added to dodecane (250 cm³) in a reaction vessel. The reaction charge was heated with mechanical agitation under a nitrogen atmosphere at 184° C. for 2 hours to give a 23% yield of a water-insoluble product with an IV of 0.44 $dlg^{-1}$ measured as in Example 1.

EXAMPLE 4

TPA/DMD nylon salt (0.27 moles; 100 g) and AHP (10% wt; 1.0 g) with dodecane (100 cm³) as a fluidising medium were heated with mechanical agitation under a nitrogen atmosphere for 5 hours at 215° C. to give a water-insoluble fraction with a yield of 60% which had an IV of 1.27 dlg$^{-1}$ measured as in Example 1.

EXAMPLE 5

The salt of terephthalic acid and diaminodicyclohexylmethane was prepared by first dissolving 52.69 g of the amine in 3500 cc water at 90° C. in a stirred 5 liter flask and adding 41.65 g terephthalic acid. The pH was adjusted to about 7.5 with diamine to give a clear solution, and the salt precipitated upon cooling. About 60 gm of the nylon salt was recovered.

20 g of the above nylon salt and 0.4 g ammonium hypophosphite were blended with 400 g liquid paraffin using a high speed disperser disintegrator to form a fine suspension. The suspension was refluxed under $N_2$ with high speed agitation to give a quantitative yield of polymer with an IV of 0.25 dlg$^{-1}$ measured as in Example 1.

We claim:

1. A process for producing homopolyamides from a nylon forming salt formed from substantially equimolar proportions of a diamine and a dicarboxylic acid said process comprising:
   (a) dispersing or suspending or dispersing and suspending in a liquid aliphatic hydrocarbon medium the nylon salt in a finely divided state thereof having uniformly preblended therein a solid hypophosphite catalyst and either,
   (b) polycondensing the nylon salt containing the preblended catalyst so dispersed, suspended, or dispersed and suspended at a temperature above 100° C. but below the lower of the two temperatures representing the melting point of the nylon salt and the eventual polyamide product respectively where the polyamide product is a crystalline, or,
   (c) polycondensing the nylon salt containing the preblended catalyst so dispersed, suspended, or dispersed and suspended at
   a temperature of about 15° to 20° C. below the melting point of the salt of at least 25° C. below the melting point of the crystalline product, whichever is the lower of the two.

2. A process according to claim 1 wherein the acid component of the nylon salt is aliphatic, alicyclic or aromatic dicarboxylic acid.

3. A process according to claim 2 wherein the acid component is selected from adipic acid, suberic acid, sebacic acid, dodecanedioic acid, 1,2- or 1,3-cyclohexane dicarboxylic acid, 1,2- or 1,3-phenylene diacetic acid, 1,2- or 1,3-cyclohexane diacetic acid, isophthalic acid or terephthalic acid.

4. A process according to claim 1 wherein the diamine component of the nylon salt is an aliphatic, alicyclic or an aromatic diamine.

5. A process according to claim 4 wherein the amine component is selected from hexamethylene diamine, 2-methyl pentamethylene diamine, 2-methyl hexamethylene diamine, 3-methyl hexamethylene diamine, 2,5-dimethyl hexamethylene diamine, 2,2-dimethyl pentamethylene diamine, 5-methylnonane diamine, dodecamethylene diamine, 2,2,4- and 2,4,4-trimethyl hexamethylene diamines, 2,2,7,7-tetramethyl octamethylene diamine, isophoronediamine, meta-xylylene diamine or paraxylylene diamine.

6. A process according to claim 1 wherein the nylon forming salt is selected from the group consisting of amino-acids and lactams.

7. A process according to claim 1 wherein the hypophosphite catalyst is selected from the hypophosphites of an alkali metal or an alkaline earth metal or ammonium hypophosphite.

8. A process according to claim 1 wherein the catalyst is in solid particulate form during pre-blending.

9. A process according to claim 1 wherein the amount of catalyst pre-blended with the nylon salt is from 0.01–5% weight/volume of the nylon salt in the blend.

10. A process according to claim 1 wherein the nylon salt and the catalyst are pre-blended by grinding the two together into fine particles either before dispersion into the liquid aliphatic hydrocarbon or during the disersion of the two in the liquid hydrocarbon.

11. A process according to claim 1 wherein the liquid aliphatic hydrocarbon has at least five carbon atoms and the nylon salt is insoluble in the hydrocarbon.

12. A process according to claim 1 wherein the combined weight of nylon salt and catalyst to the volume of liquid hydrocarbon has a ratio from 10 to 60 weight/volume.

13. A process according to claim 1 wherein the polycondensation is carried out in the substantial absence of any oxidising gases, the dispersion being refluxed in an atmosphere which is inert under the reaction conditions.

14. A process according to claim 1 wherein the reactants are substantially dry and no water from an external source is added to the polycondensation reaction.

* * * * *

UNITED STATES PATENT AND TRADEMARK OFFICE
CERTIFICATE OF CORRECTION

PATENT NO. : 4,925,914

DATED : May 15, 1990

INVENTOR(S) : JOHN G. DOLDEN et al

It is certified that error appears in the above-identified patent and that said Letters Patent is hereby corrected as shown below:

Col. 2, l. 15, should read "two temperatures representing"

Col. 4, Example 4, l. 66, should read "(1.0% wt; 1.0g)"

Signed and Sealed this

Eleventh Day of June, 1991

Attest:

HARRY F. MANBECK, JR.

Attesting Officer

Commissioner of Patents and Trademarks